United States Patent
Archer et al.

(10) Patent No.: US 8,521,502 B2
(45) Date of Patent: Aug. 27, 2013

(54) PASSING NON-ARCHITECTED REGISTERS VIA A CALLBACK/ADVANCE MECHANISM IN A SIMULATOR ENVIRONMENT

(75) Inventors: Charles J. Archer, Rochester, MN (US); Michael A. Blocksome, Rochester, MN (US); Joseph D. Ratterman, Rochester, MN (US); Brian E. Smith, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 475 days.

(21) Appl. No.: 12/785,141

(22) Filed: May 21, 2010

(65) Prior Publication Data

US 2011/0288848 A1 Nov. 24, 2011

(51) Int. Cl.
*G06F 9/45* (2006.01)

(52) U.S. Cl.
USPC .............................................. 703/22

(58) Field of Classification Search
USPC .............................................. 703/22
See application file for complete search history.

(56) References Cited

U.S. PATENT DOCUMENTS

| 2008/0177756 A1* | 7/2008 | Kosche et al. | 707/100 |
| 2011/0145838 A1* | 6/2011 | de Melo et al. | 719/318 |

OTHER PUBLICATIONS

Sergey N. Zheltov et al., "Simulation without a simulator," Jun. 19, 2009, downloaded from the internet from http://software.intel.com/en-us/articles/simulation-without-a-simulator, eight pages.*

Matt T. Yourst, "PTLsim: A Cycle Accurate Full System x86-64 Microarchitectural Simulator," 2007, IEEE International Symposium on Performance Analysis of Systems & Software, pp. 23-34.*
Todd Austin et al., "SimpleScalar: An Infrastructure for Computer System Modeling," 2002, Computer, Feb. 2002, pp. 59-67.*
Hoonmo Yang et al., "Design of a cycle-accurate user-retargetable instruction-set simulator using process-based scheduling scheme," 2004, LNCS 3314, Springer-Verlag, pp. 266-273.*
"GUI for bochs debugger," Sep. 9, 2008, downloaded from the internet from http://forum.osdev.org, 13 pages.*
AMD, "AMD SimNow Simulator 4.6.1," Nov. 2009, Advanced Micro devices, pp. 1-263.*
Stuart Sutherland, "The Verilog PLI Handbook," second edition, 2002, Kluwer Academic Publishers, pp. 197-240.*
Patrick Bohrer et al., "Mambo—A Full System Simulator for the PowerPC Architecture," 2004, ACM SIGMETRICS Performance Evaluation Review, vol. 31, issue 4, pp. 8-12.*
"Performance analysis with the IBM full-system simulator," 2007, International Business Machines, pp. 1-34.*
Stephen Alan Herrod, "Using complete machine simulation to understand computer system behavior," 1998, Stanford University, pp. 1-121.*

* cited by examiner

*Primary Examiner* — Dwin M Craig
*Assistant Examiner* — Russ Guill
(74) *Attorney, Agent, or Firm* — Patterson & Sheridan LLP

(57) ABSTRACT

Embodiments of the invention provide a method of calculating performance counter data for a computer simulator, while minimizing the performance costs associated with cycle-accurate simulation. A callback may be associated with the instructions of a user program and, when the instructions are executed, the associated callbacks may be executed as well. Upon execution, the callbacks may calculate performance counter data related to the associated instruction.

21 Claims, 6 Drawing Sheets

PASSING NON-ARCHITECTED REGISTERS VIA A CALLBACK/ADVANCE MECHANISM IN A SIMULATOR ENVIRONMENT

BACKGROUND

1. Field

Embodiments of the invention relate generally to computer-based simulations and more particularly to techniques for passing non-architected registers via a callback/advance mechanism in a simulator environment.

2. Description of the Related Art

Computer simulators are often used to model other computers, with modern simulators being capable of simulating hardware architecture with a very high degree of precision. These simulators are highly useful for a broad variety of applications, such as software development, performance testing, hardware architecture prototyping, and educational purposes, to name but a few examples.

International Business Machines (IBM) has developed a full-system simulator for modeling Power PC systems under the name Mambo. Simulators such as Mambo may be configured to simulate a specific set of hardware and to execute user programs designed for that hardware. Additionally, simulators may execute these programs while maintaining a high level of detail regarding the operations of the simulated hardware. As such, one common use for simulators is to develop and test software applications for a given hardware architecture before the actual hardware is made readily available to the development community. Simulators allow software developers to begin the development process before they have actually acquired the physical hardware, allowing them to begin development without waiting until the hardware is physically manufactured and available for public use. Additionally, by using a simulator, developers may save on equipment costs by avoiding purchasing expensive hardware they are developing applications for. In situations where the physical hardware is expensive, these savings may be substantial and the use of a simulator essential.

Additionally, hardware architects may use highly accurate simulators to test potential hardware architectures before they are physically manufactured. The use of these simulators may result in substantial cost and time savings for hardware manufacturers. Developing and fabricating a modern computer processor is a difficult and expensive process in terms of both time and resources. Furthermore, if a defect or a performance bottleneck is found in the design after the hardware has been manufactured, this may result in a sizable waste of time and resources. However, by testing the hardware architecture first in a highly accurate simulator, these potential defects and performance bottlenecks may be corrected before the hardware is physically manufactured, thus resulting in significant cost and time savings for the manufacturer.

Modern simulators may be written to maintain various levels of accuracy regarding the hardware being simulated. For instance, simulators may be clock cycle-accurate, where every operation performed by the processor at each clock cycle is simulated. However, this high level of detail comes at the cost of added complexity and decreased performance for the simulation. Thus, in a situation where a user is only concerned with how a particular computer program runs on the simulated hardware (and not about the lower-level operations of the simulated hardware), a cycle-accurate simulator may not be ideal. Alternatively, simulators may be designed to maintain instruction-level accuracy, where the accuracy of the simulator is limited to the instruction level and each and every lower-level hardware operation is not necessarily simulated. However, while instruction-accurate simulators often achieve performance gains over cycle-accurate simulators, this performance comes at the cost of information about the underlying hardware being simulated. Thus, instruction-accurate simulators may not be appropriate for certain tasks, such as testing the performance of a particular hardware architecture.

Because each user using a particular simulator may prefer a different level of accuracy, additional customization in a simulator may be beneficial. For example, a simulator that can be configured to provide instruction-level accuracy for a first user, and reconfigured to provide cycle-level accuracy for a second user, allows users to reduce expenses by sharing a single simulator while retaining the advantages of using a simulator with their preferred accuracy-level and performance. Additionally, in some circumstances, a user may prefer to have cycle accuracy for certain instructions in a user program, and may not care if the simulator is cycle-accurate for other instructions. In such a situation, a hybrid approach, where performance counters are only calculated for particular instructions, may be advantageous.

SUMMARY

One embodiment of the invention includes a method of obtaining performance counter data for a computer architecture being simulated by a computer simulator. The method may generally include retrieving an instruction to execute from an input instruction stream, retrieving a callback associated with the instruction from the input instruction stream, and executing the instruction on the computer simulator. The method may also include executing the associated callback associated with the instruction, wherein the callback calculates the performance counter data for the instruction.

Still another embodiment of the invention includes a system having a computer processor and a memory containing a program which, when executed on the computer processor, performs a operation for obtaining performance counter data for a computer architecture being simulated by a computer simulator. The operation itself may generally include retrieving an instruction to execute from an input instruction stream, retrieving a callback associated with the instruction from the input instruction stream, and executing the instruction on the computer simulator. The operation may also include executing the associated callback associated with the instruction, wherein the callback calculates the performance counter data for the instruction.

Still another embodiment of the invention includes a computer-readable storage medium containing a program which, when executed, performs an operation for obtaining performance counter data for a computer architecture being simulated by a computer simulator. The operation itself may generally include retrieving an instruction to execute from an input instruction stream, retrieving a callback associated with the instruction from the input instruction stream, and executing the instruction on the computer simulator. The operation may also include executing the associated callback associated with the instruction, wherein the callback calculates the performance counter data for the instruction.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Figure 1:
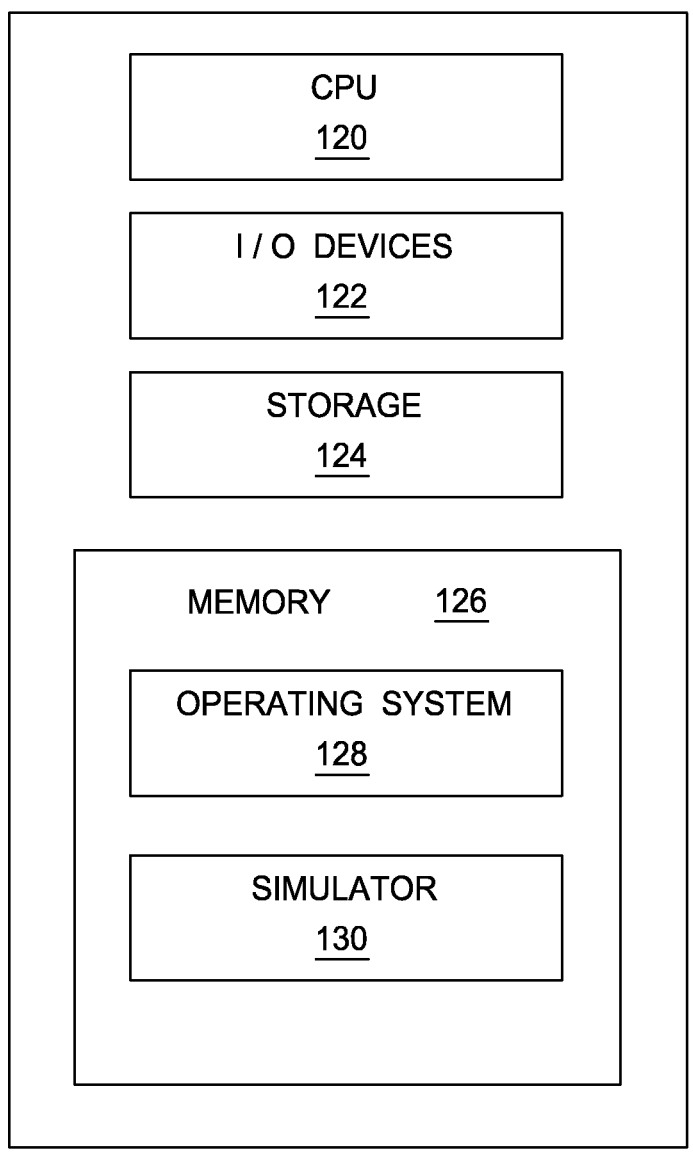
FIG. 1 is a block diagram of components of a computer system configured to run a simulator, according to one embodiment of the present invention.

Modern simulators are capable of simulating different hardware architectures at a high level of detail. However, different users may require different levels of simulation detail. For example, a user testing the performance of a new hardware architecture may prefer a cycle-accurate simulation. However, a second user testing a software application on the new hardware architecture may prefer instruction-level accuracy to avoid the performance impact that comes from using a cycle-accurate simulator.

Embodiments of the invention provide a method for associating a callback with instructions in an input instruction stream to a simulator. The callback allows additional functionality and customization for the simulator. For example, embodiments of the invention may be used to maintain certain cycle-accurate performance counter data in an otherwise instruction-level accurate simulator.

In one embodiment, a callback is associated with each of one or more instructions in an input instruction stream. Each callback may emulate certain performance counter data for the associated instruction. Upon execution of each instruction, the simulator executes the associated callback as well. The callbacks may calculate and store the performance counter data in a designated memory area on the computer system running the simulator. Applications on the computer system may then read and interpret this data.

In the following, reference is made to embodiments of the invention. However, it should be understood that the invention is not limited to any specifically described embodiment. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive) on which information is permanently stored; (ii) writable storage media (e.g., floppy disks within a diskette drive or hard-disk drive) on which alterable information is stored. Such computer-readable storage media, when carrying computer-readable instructions that direct the functions of the present invention, are embodiments of the present invention. Other media include communications media through which information is conveyed to a computer, such as through a computer or telephone network, including wireless communications networks. The latter embodiment specifically includes transmitting information to/from the Internet and other networks. Such communications media, when carrying computer-readable instructions that direct the functions of the present invention, are embodiments of the present invention. Broadly, computer-readable storage media and communications media may be referred to herein as computer-readable media.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

FIG. 1 is a high-level block diagram of components of a computer system 100 configured to run a simulator 130, according to one embodiment of the present invention. As will be understood by one of ordinary skill in the art, any computer architecture and simulator capable of performing the functions described herein may be used. As shown, computer system 100 includes computer processor(s) 120, one or more I/O devices 122, storage media 124 and system memory 126. Computer processor 120 may be any processor capable of performing the functions described herein. I/O devices 122 may represent a variety of input and output devices, including keyboards, mice, visual displays, printers and so on.

In the pictured embodiment, memory 126 contains an operating system 128 and a simulator 130. The memory 120 may include one or more memory devices having blocks of memory associated with physical addresses, such as random access memory (RAM), read only memory (ROM), flash memory or other types of volatile and/or non-volatile memory. Thus, for example, memory 126 may comprise RAM containing an instance of the Advanced Interactive Executive (AIX) operating system 128, as well as the Mambo full-system simulator 130.

Simulator 130 may represent a cycle-accurate simulator or an instruction-accurate simulator. Additionally, embodiments of the invention add cycle accuracy to an instruction-accurate simulator through the use of callbacks associated with the instructions of a user program. Alternatively, simulator 130 may represent an instruction-accurate simulator with partial cycle accuracy. For example, according to embodiments of the invention, the simulator 130 may be an instruction-accurate simulator that, through the use of callbacks, is cycle-accurate for particular instructions. In other embodiments, the callbacks may allow for cycle accurate calculations for non-architected performance counters (i.e., performance counters not included in the simulated computer architecture). In yet another embodiment, the callbacks may calculate particular performance counters only when a user is monitoring those performance counters, thus preserving system resources when no user is monitoring the performance counters. In still yet another embodiment, the callbacks may retrieve persisted performance counter data when subsequent blocks of code are executed. Here, the simulator may save resources by only calculating performance counter data once for each block of code in a user program. Furthermore, the simulator 130 may communicate with external devices, either physical or simulated devices, through the use of callbacks. In this way, part of the simulation may be handed off to other devices, which may result in increased performance (e.g., through parallelization of the simulator) or increased accuracy (e.g., through offloading some calculation to the actual devices rather than a simulation). Of course, these examples are not meant to be an exhaustive list, but rather are intended for illustrative purposes only.

Figure 2:
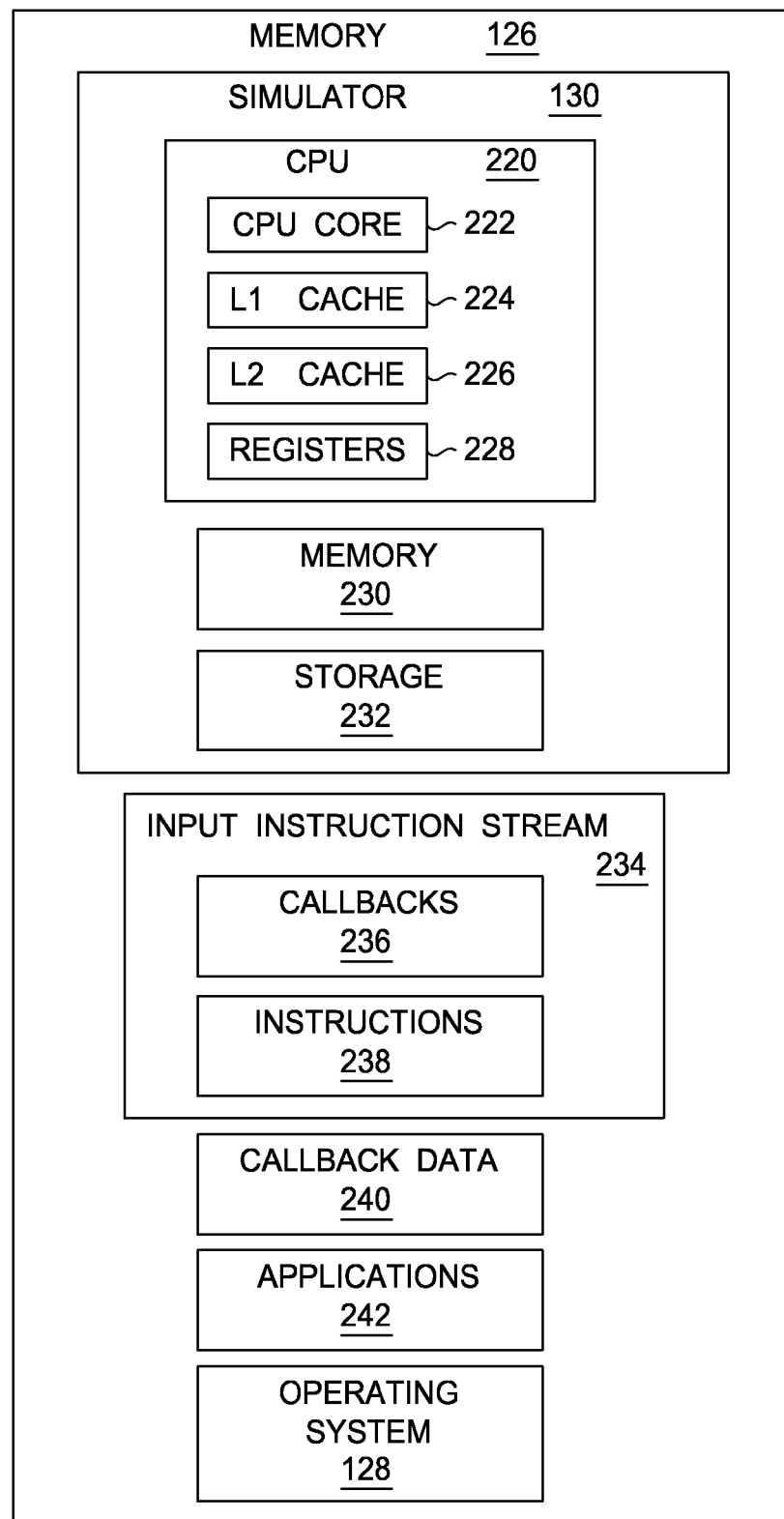
FIG. 2 is a block diagram of a computer memory of the computer system of FIG. 1, according to one embodiment of the invention.

FIG. 2 is a high-level block diagram 200 of the computer memory 126 of the computer system 100 of FIG. 1, according to one embodiment of the invention. As shown, memory 126 contains a simulator 130, which is configured to model a hardware architecture containing a processing unit 220, system memory 230, and storage media 232. System memory 126 also contains an input instruction stream 234, callback data 240, applications 242 and an operating system 128. Illustratively, the input instruction stream 234 contains instructions 238 that constitute a user program to be executed by the simulator 130. Furthermore, a callback 236 is associated with each instruction 238 in the instruction stream 234.

As shown, the simulated processing unit 220 contains a central processing unit ("CPU") core 222, L1 cache 224, L2 cache 226 and general purpose registers 228. This hardware architecture is intended only as an example, and as one of ordinary skill in the art will recognize, numerous other architectures containing various other types of cache, registers and other components may be simulated as well. Additionally, it is contemplated that certain components of the simulator may not be wholly contained in system memory 126. For example, data in simulated storage 232 may in fact be stored in storage media 124 of the computer system 100, or alternatively to a mapped network storage location.

As mentioned above, the input instruction stream 234 contains a plurality of instructions 238 that may be executed on the simulated CPU 220. Instructions in the instruction stream 234 may be associated with a callback 236. The callback may be executed when the associated instruction 238 is executed. Alternatively, the callbacks 236 may be executed based on a different instruction-related operation, such as an instruction decode operation or an instruction retiring operation. When executed, callbacks 236 may perform various tasks, including updating data in the callback data 240. For instance, a particular callback 236 may calculate certain performance counter data each time its associated instruction 238 is executed. Applications 242 may then analyze and/or display the performance counter data in the callback data area of memory 240.

The use of callbacks 236 may be useful in monitoring non-architected performance counters (i.e., performance counters not part of the actual hardware being simulated). For example, if the simulated hardware architecture does not contain a performance counter for translation lookaside buffer (TLB) misses, then even a cycle-accurate simulator would not calculate the TLB misses performance counter for each instruction. However, through the use of the callbacks 236, a user may still monitor TLB misses performance counter data by associating each instruction 238 with a callback 236 that calculates TLB misses performance data.

Figure 3:
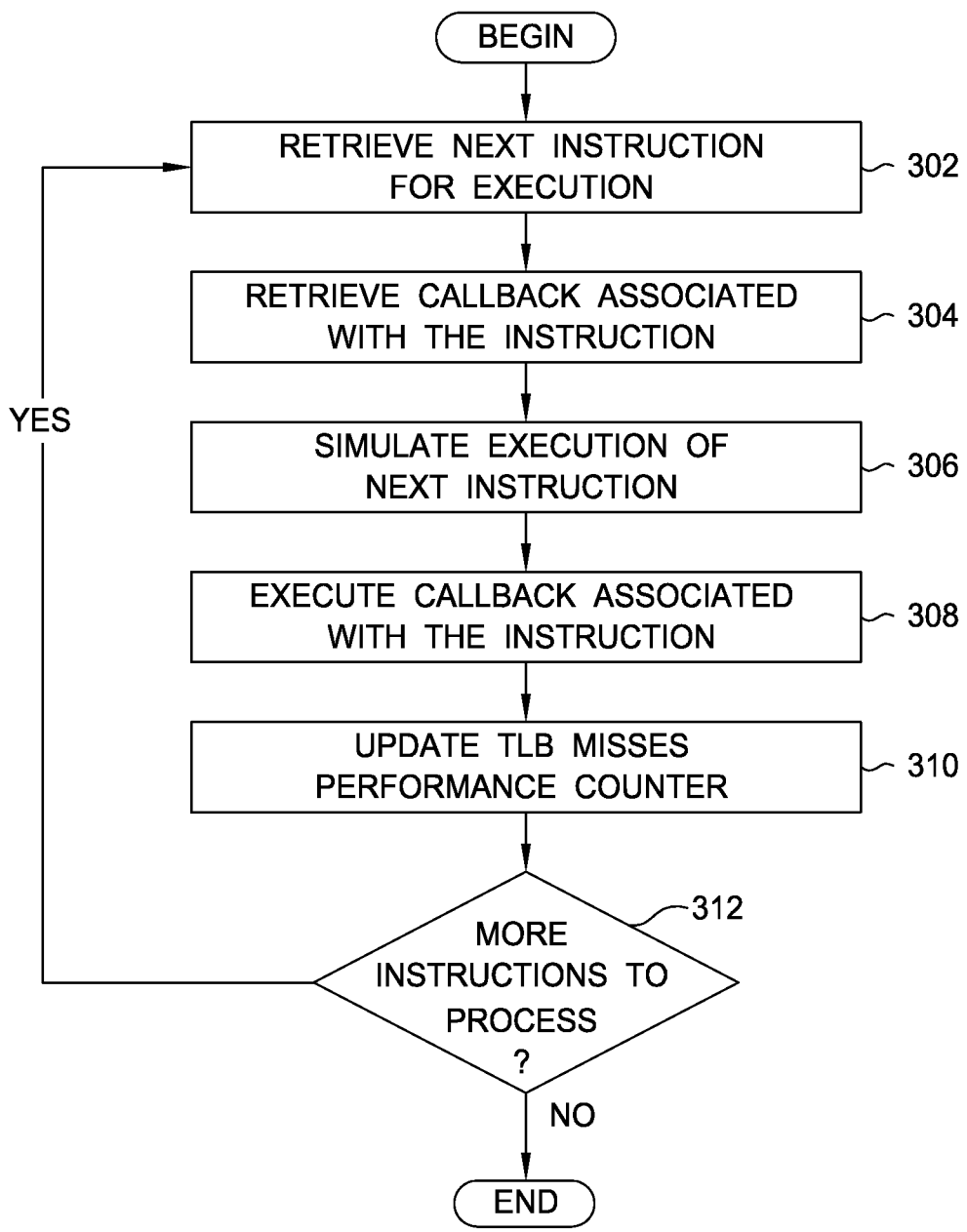
FIG. 3 is a flow diagram illustrating a method for maintaining a TLB misses performance counter on a computer simulator.

FIG. 3 is a flow diagram illustrating a method 300 for maintaining a TLB misses performance counter on a computer simulator, according to one embodiment of the invention. As shown the method begins at step 302, where the simulator retrieves the next instruction for execution. At step 304, the simulator retrieves the callback 236 associated with the instruction. For example, using the computer system 100 described above, simulator 130 may retrieve the next instruction 238 and its associated callback 236 from instruction stream 234. At step 306, the simulator executes the retrieved instruction. At step 308, the simulator executes the associated callback 236. The callback 236 may be executed immediately following the execution of the instruction 238. At step 310, the simulator calculates the TLB misses performance counter data for the instruction 238 and updates the TLB misses performance counter. Of course, even though method 300 involves a TLB misses performance counter, other performance counters, both architected and non-architected (i.e., performance counters not maintained by the actual hardware being simulated), may be calculated.

At step 312, the simulator 130 determines whether there are more instructions 238 in the instruction stream 234 to process. If there are no instructions 238 remaining, then the user program has been executed. However, if there are still instructions 238 remaining, the simulator retrieves the next instruction 238 and the method begins again at step 302.

One advantage to updating the performance counters using callbacks 236 is that partial or complete cycle-level accuracy may be added to a simulator that is merely instruction accurate. For instance, an instruction accurate simulator may not simulate low-level hardware operations, and thus may not be able to monitor performance counters such as TLB misses. However, by calculating this information with the callbacks 236, a user wishing to monitor only the TLB misses performance counter may do so while still retaining many of the performance benefits of an instruction accurate simulator. Alternatively, a user may monitor non-architected performance counters through the use of callbacks 236. Thus, even if the simulated architecture does not monitor a certain performance metric, the user may add this functionality to the simulator without changing the hardware architecture being modeled.

The method 300 allows a user to monitor changes in a TLB misses performance counter while executing instructions in a user program. However, in some cases, changes in the value of a performance counter are more important than the actual value of the performance counter. In such a situation, a user performing a simulation (cycle or instruction accurate) may wish to calculate the performance counter only when the user is actively monitoring that performance counter.

Figure 4:
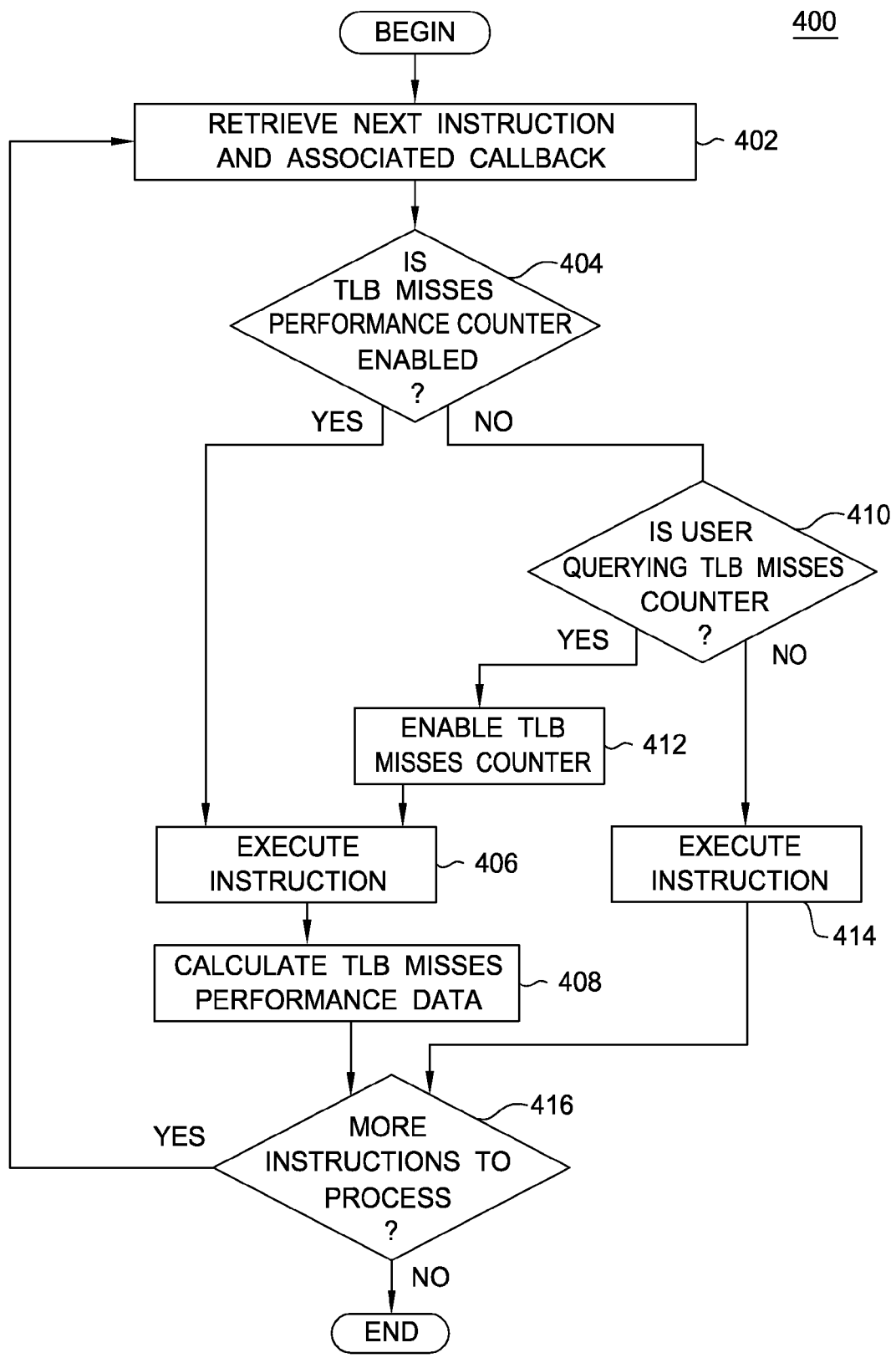
FIG. 4 is a flow diagram illustrating a method for maintaining a TLB misses performance counter based on a computer simulator based on user actions.

FIG. 4 is a flow diagram illustrating a method 400 for maintaining a TLB performance counter based on a computer simulator based on user actions. As shown, the method begins at step 402, where the simulator 136 retrieves the next instruction 238 and the associated callback 236 from the input instruction stream 234. At step 404, the simulator determines whether the TLB misses performance counter is enabled. Illustratively, the simulator makes this determination by executing the callback retrieved at step 402. It is contemplated that a performance counter such as this may be enabled explicitly by a user, such as through a configuration setting, or may be enabled automatically based on user actions.

If the simulator determines (at step 404) that the TLB misses performance counter is enabled, the simulator then executes the retrieved instruction at step 406. At step 408, the simulator then calculates TLB misses performance counter data. In this embodiment, this calculation is performed by the callback retrieved at step 402. As such, the calculated TLB misses performance counter data may be stored in the callback data section 240 of memory 126. Of course, the performance counter data may be stored in other places, including other sections of memory 126, storage 124, or on a remote storage device (now shown). The performance counter data may also be displayed to the user via I/O devices 122 on the computer system 100.

After the performance counter data is calculated (at step 408), the simulator determines whether there are more instructions in the input instruction stream 234 to process. If the simulator determines that there are instructions left to process, the simulator retrieves the next instruction and the associated callback (at step 402) and the method begins again. If there are no instructions left to process, then all instructions in the input instruction stream 234 have been processed and the method is complete.

If the simulator determines the TLB misses counter is not enabled (step 404), the simulator determines whether the user has queried the TLB misses performance counter (at step 410). In one embodiment, the simulator may determine whether the user is currently querying the TLB misses performance counter. In an alternate embodiment, the simulator may look to see whether the user has queried the performance counter recently (i.e., has the user queried the performance counter within a predetermined period of time). In yet another embodiment, the simulator may look at historical patterns of the user querying the performance counter. For example, if a user queries the TLB misses performance counter every time he executes a particular user program, the simulator may detect this pattern and answer "yes" in decision block 410 when the user again runs that program. These examples are intended only for illustrative purposes, and other algorithms for determining when to monitor a performance counter may of course be used instead.

Regardless of the criteria used at step 410 to determine if the user has queried the TLB misses performance counter, the simulator begins calculating the TLB misses performance counter (at step 412). At step 406, the simulator executes the instruction and then calculates the TLB misses performance counter data for that instruction (at step 408). The simulator then determines whether there are any instructions remaining to process (at step 416), and, if there are remaining instructions, the simulator retrieves the next instruction and callback (at step 402) and the method begins again.

If the simulator determines that the user is not querying the performance counter (at step 410), the simulator proceeds to execute the instruction (at step 414). After executing the instruction, the simulator then determines whether there are any instructions in the input instruction stream left to process (at step 416). Note, however, that when the simulator determines the user is not querying the TLB misses performance counter, no data is simulated for that performance counter.

One advantage to this embodiment is that partial or complete cycle-accuracy may be added to an otherwise instruction accurate simulator. This is beneficial in several ways. For instance, according to embodiments of the invention, users that prefer cycle accuracy may share the same simulator as users who prefer the performance gains of an instruction-accurate simulator through the use of callbacks. Furthermore, users who require a cycle-accurate simulator may not require complete cycle-accuracy, and may prefer to have cycle accurate calculations only for particular instructions in a user program. For instance, a particular user may only wish to monitor the TLB misses performance counter, and may not care whether other performance counters and low-level operations are calculated every cycle. According to embodiments of the invention, the user may associate a callback with each instruction in the input instruction stream 234 that calculates only the value for the TLB misses performance counter each cycle. In such a scenario, the user may see many of the performance gains of an instruction-accurate simulator, since only the TLB misses performance counter is calculated, but the user is still provided with the necessary performance counter.

A further advantage is that the TLB misses performance counter is only calculated once it has been queried by the user. In general, the values of many performance counters may not always be useful in and of themselves. For example, the user may not care about the end value of a performance counter after several hours of executing instructions, but rather may desire to monitor changes in the performance counter from cycle to cycle. Furthermore, the user may monitor the TLB misses performance counter while executing a particular set of instructions, while at the same time, not needing to monitor value of the performance counter for other sets of instructions. However, as with any calculation, calculating the performance counter uses system resources and decreases simulator performance. Thus, as is done in method 400, it is advantageous to only calculate the TLB misses performance counter when the user is querying that counter. By using this embodiment of the invention, the user is provided with the performance counter data he needs, when the user needs that information, but the performance counter is not calculated when the user is not querying that counter, thus resulting in performance gains for the simulator.

The method 400 calculates performance counters only when the user is monitoring those counters. However, in some cases, such as when a user is monitoring a large number of performance counters, or when the performance counter calculations are particularly complex, a user may wish to avoid redundant calculations in order to preserve system resources. Additionally, for certain performance counters and certain blocks of code, the value of performance counter may be approximated using other performance counter data for similar or identical blocks of code.

Figure 5:
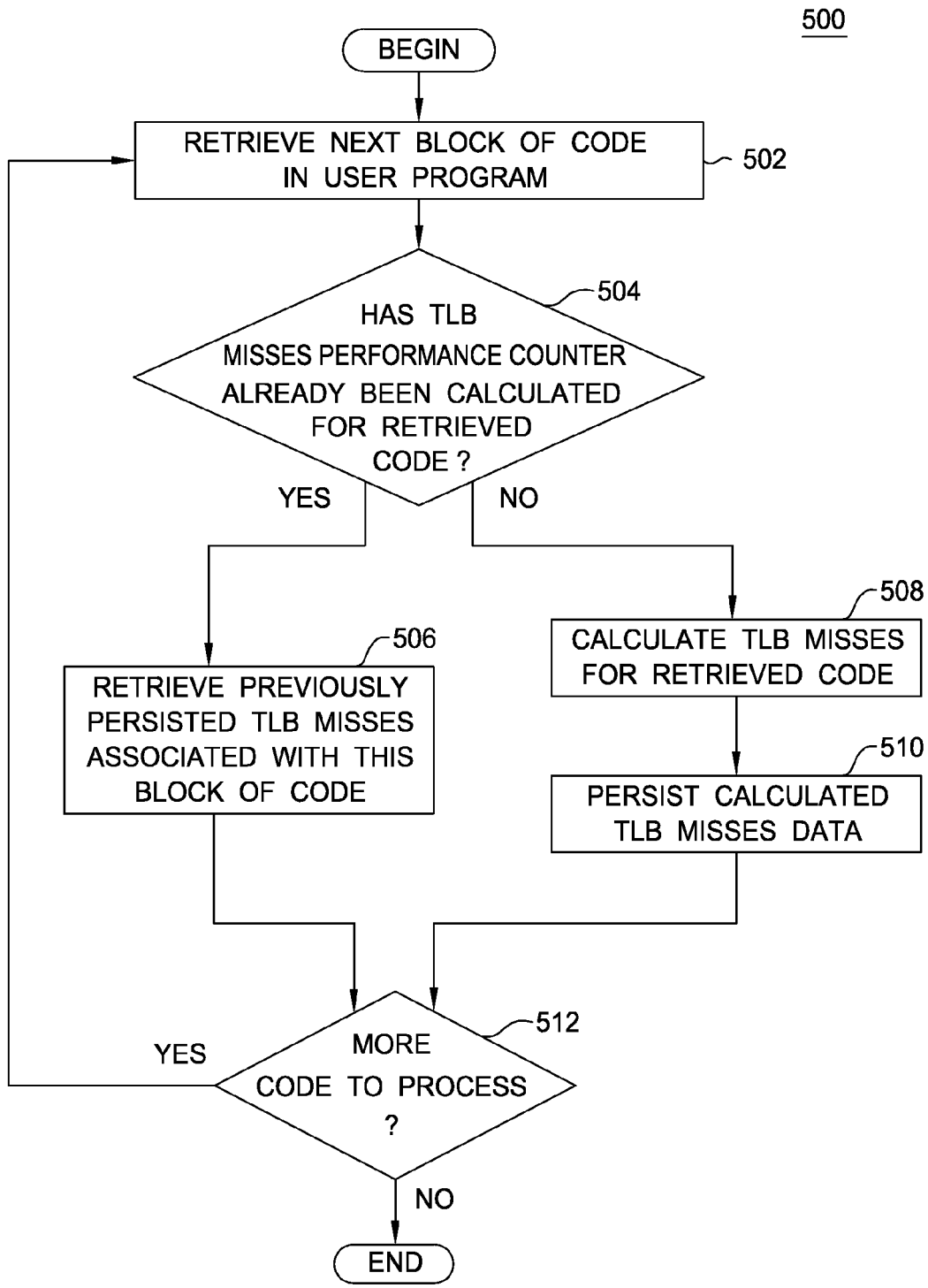
FIG. 5 is a flow diagram illustrating a method for calculating and maintaining TLB misses performance counter data for a plurality of code blocks.

FIG. 5 is a flow diagram illustrating a method 500 for calculating and maintaining TLB misses performance counter data for a plurality of code blocks. As shown, the method begins at step 502, where the simulator retrieves the next block of code in a user program. For example, the block of code may consist of a plurality of instructions 238 from the input instruction stream 234. Additionally, the simulator retrieves the associated callbacks 236 for each of the instructions 238 (at step 502).

At step 504, the simulator executes the associated callback and determines whether TLB misses performance counter data has previously been calculated for the retrieved block of code. The simulator may determine whether performance counter data has been previously persisted for the exact block of code. Alternatively, the simulator may determine that performance counter data has been previously calculated and persisted for a similar block of code, and use that performance counter data as an approximation for the current block of code. Of course, by using the performance counter data for similar blocks of code (that is, for blocks of code that are not identical but are only similar to each other), the accuracy of the performance counter data may decrease. However, this decrease in accuracy comes with an increase in performance for the simulator, since fewer performance counters will actually be calculated, as more will simply be retrieved from memory. For some users, this gain in performance will outweigh the decrease in accuracy for the performance counter data.

As shown, if the simulator determines that the performance counter data has already been calculated for the particular block of code, the simulator retrieves the previously-persisted TLB misses performance counter data associated with the particular block of code (at step 506). The previously-persisted performance counter data may be stored in memory 126 on the computer system 100. For example, the previously-persisted performance counter data may be stored in the callback data area 240 of memory 126. Alternatively, the data may be persisted in storage 124, or on remote storage, such as a mapped network storage device (not shown). At step 504, if the simulator determines that the performance counter data was not previously calculated, the simulator calculates the TLB misses performance counter for the retrieved block of code (at step 508) and stores the performance counter data (at step 510). The simulator also stores the association between the performance counter data and the current block of code (at step 510), such that the performance counter data may be retrieved the next time the block of code is executed by the simulator.

Note that in this embodiment the performance counter data is retrieved from a storage location, and is not recalculated for the current block of code (at step 506). This is advantageous for system performance, as the simulator only calculates the performance counter data for each block of code once. By not calculating these performance counters for each instruction or even for each and every block of code, the simulator is able to make fewer calculations and thus performs more efficiently. As noted above, these performance gains may come at the cost of accuracy. However, certain users may find an approximation of the performance counter data sufficient, and thus take advantage of the performance gains by using method 500. After the calculated TLB misses data is stored or the previously stored TLB misses data is retrieved, the simulator determines whether there are more code blocks to process (step 512). If the simulator determines that there are more code blocks to process, the method 500 returns to step 502, where the next block of code in the user program is retrieved. If instead the simulator determines that there are no more blocks of code to process, the method 500 ends.

Figure 6:
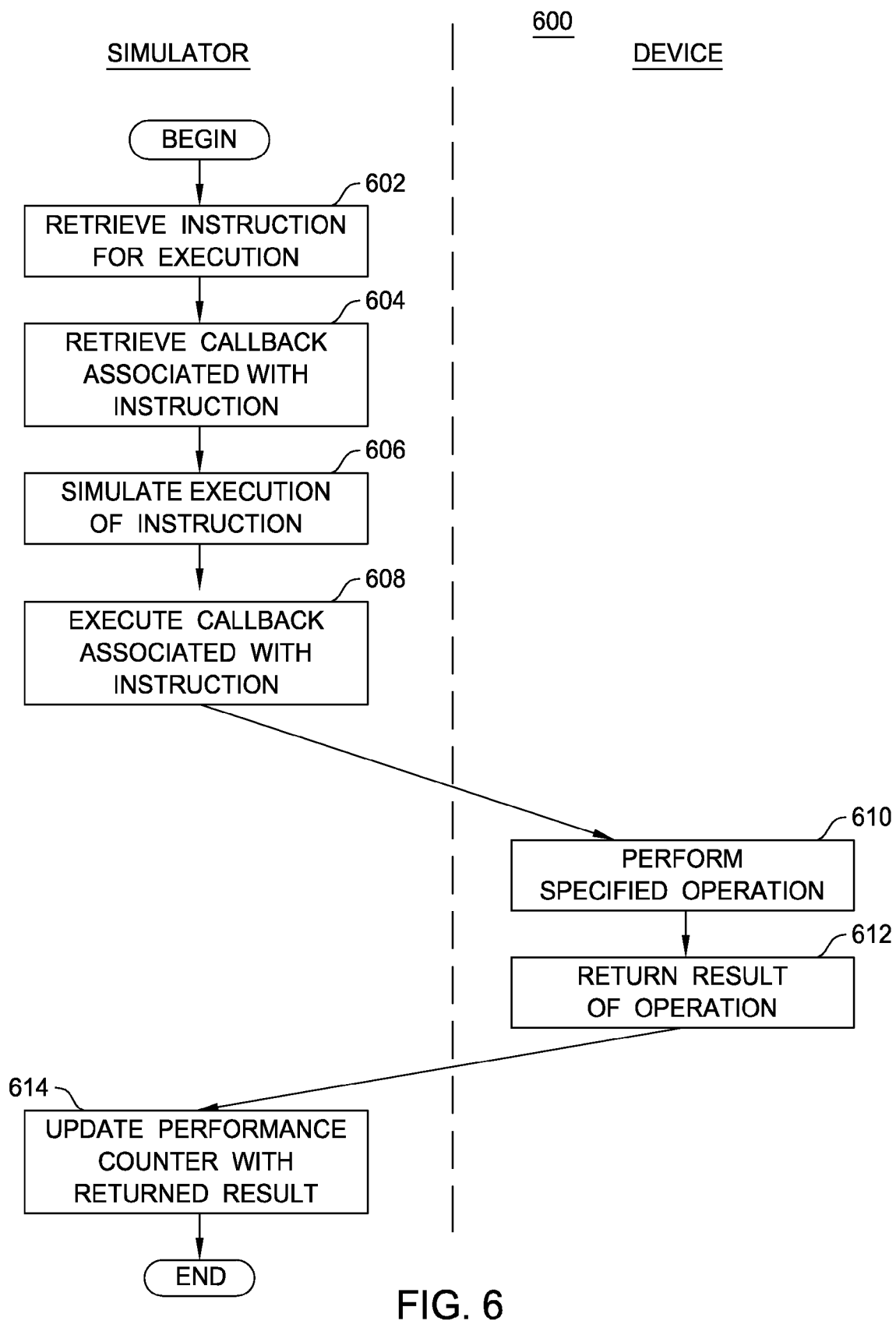
FIG. 6 is a flow diagram illustrating a method for calculating performance counter data through the use of an external device.

FIG. 6 is a flow diagram illustrating a method for calculating performance counter data through the use of an external device. As shown, the method begins at step 602, where the simulator retrieves the next instruction of a user program for execution. For example, the instruction may be retrieved from the input instruction stream 234. Subsequently, at step 604, the simulator retrieves a callback associated with the instruction and then simulates the execution of the instruction (at step 606).

At step 608, the simulator executes the callback associated with the instruction. In this embodiment, the callback, when executed, sends an operation to be executed to an external device in order to provide performance counter data for operations involving the device. In this embodiment, the operation specified in the callback may be any operation performed on an external device that influences performance counter data on the computer system being simulated by the simulated 130. Example external devices include system devices, floating-point units (FPUs), and memory controllers. The external device may be a physical device. Alternatively, the external device may be a virtual device emulated by a second simulator. The second simulator may run on the same computer system 100 as the simulator 130, or may run on a separate computer system. Upon receiving the operation to be performed, the external device performs the operation (at step 610) and then returns the result of the operation back to the callback (at step 612). At step 614, the callback receives the returned result and updates the associated performance counter based on the returned result.

In this embodiment, multiple simulators may be "chained" together. That is, when a particular callback is executed by the first simulator, the callback starts a second simulator to execute the operation specified in the callback. Of course, the second simulator may operate at different levels of accuracy, ranging from simply returning a predetermined result for the device (i.e., instruction level accuracy) to simulating every low-level operation performed by the actual device (i.e., cycle level accuracy).

One advantage to this embodiment is the simulator may experience performance gains by using an external device to execute operations. For instance, callbacks may be used to offload some operations to external devices (either physical or virtual) in order to execute operations in parallel. Furthermore, by offloading operations to the external device, the simulator performs fewer calculations thus runs more efficiently. Additionally, a physical external device may execute the operations more quickly than a simulator can simulate them, as simulators often run many times more slowly than the devices they are simulating. Another advantage to this embodiment is that the results returned by the external devices may be more accurate than a simulated result, as, in the case of a physical external device, the returned result is an actual result, rather than a simulated result.

While the foregoing is directed to embodiments of the present invention, other and further embodiments of the invention may be devised without departing from the basic scope thereof, and the scope thereof is determined by the claims that follow.

What is claimed is:

1. A method of obtaining performance counter data, in a computer simulator simulating a computer architecture, comprising:
    retrieving an instruction to execute from an input instruction stream;
    retrieving a callback associated with the instruction from the input instruction stream, wherein the callback, when executed, is configured to calculate performance counter data for a performance counter;
    executing, by operation of one or more computer processors, the instruction on the computer simulator; and
    upon determining that the performance counter associated with the retrieved callback has been queried within a predetermined period of time, executing the callback in order to calculate the performance counter data for the performance counter.

2. The method of claim 1, wherein the callback, when executed, returns a result of an operation, performed by a second computer simulator that is distinct from the computer simulator.

3. The method of claim 1, wherein the callback, when executed, returns a result of an operation, performed by one of a floating-point unit and a memory controller.

4. The method of claim 1, wherein the performance counter data simulates an operation of a performance counter not physically present in the computer architecture being simulated by the computer simulator.

5. The method of claim 1, wherein the performance counter data simulates an operation of one or more architected performance counters present in the computer architecture being simulated by the computer simulator.

6. The method of claim 1, further comprising:
receiving a request to monitor a first performance counter; and
in response to the request, monitoring the first performance counter specified by the request, wherein data for the first performance counter is calculated for each subsequent instruction associated with the first performance counter.

7. The method of claim 1, further comprising:
storing the performance counter data in association with the executed instruction; and
upon subsequent executions of the instruction on the computer simulator, populating the performance counter using the stored performance counter data, rather than calculating updated performance counter data for the performance counter using the callback.

8. A system, comprising:
a computer processor; and
a memory containing a program which, when executed on the computer processor, performs an operation for obtaining performance counter data, in a computer simulator simulating a computer architecture, the operation comprising:
retrieving an instruction to execute from an input instruction stream;
retrieving a callback associated with the instruction from the input instruction stream, wherein the callback, when executed, is configured to calculate performance counter data for a performance counter;
executing the instruction on the computer simulator; and
upon determining that the performance counter associated with the retrieved callback has been queried within a predetermined period of time, executing the callback in order to calculate the performance counter data for the performance counter.

9. The system of claim 8, wherein the callback, when executed, returns a result of an operation, performed by a second computer simulator that is distinct from the computer simulator.

10. The system of claim 8, wherein the callback, when executed, returns a result of an operation, performed by a floating-point unit or a memory controller.

11. The system of claim 8, wherein the performance counter data is for a performance counter not physically present in the computer architecture being simulated by the computer simulator.

12. The system of claim 8, wherein the performance counter data includes data for one or more architected performance counters present in the computer architecture being simulated by the computer simulator.

13. The system of claim 8, wherein the operation further comprises:
receiving a request to monitor a first performance counter; and
in response to the request, monitoring the first performance counter specified by the request, wherein data for the first performance counter will be calculated for each subsequent instruction associated with the first performance counter.

14. The system of claim 8, wherein the operation further comprises:
storing the performance counter data in association with the executed instruction; and
upon subsequent executions of the instruction on the computer simulator, populating the performance counter using the stored performance counter data, rather than calculating updated performance counter data for the performance counter using the callback.

15. A non-transitory computer-readable medium containing a program which, when executed, performs an operation for obtaining performance counter data, in a computer simulator simulating a computer architecture, the operation comprising:
retrieving an instruction to execute from an input instruction stream;
retrieving a callback associated with the instruction from the input instruction stream, wherein the callback, when executed, is configured to calculate performance counter data for a performance counter;
executing the instruction on the computer simulator; and
upon determining that the performance counter associated with the retrieved callback has been queried within a predetermined period of time, executing the callback in order to calculate the performance counter data for the performance counter.

16. The non-transitory computer-readable medium of claim 15, wherein the callback, when executed, returns a result of an operation, performed by a second computer simulator that is distinct from the computer simulator.

17. The non-transitory computer-readable medium of claim 15, wherein the callback, when executed, returns a result of an operation, performed by a floating-point unit or a memory controller, to the computer simulator.

18. The non-transitory computer-readable medium of claim 15, wherein the performance counter data is for a performance counter not physically present in the computer architecture being simulated by the computer simulator.

19. The non-transitory computer-readable medium of claim 15, wherein the performance counter data includes data for one or more architected performance counters present in the computer architecture being simulated by the computer simulator.

20. The non-transitory computer-readable medium of claim 15, wherein the operation further comprises:
receiving a request to monitor a first performance counter; and
in response to the request, monitoring the first performance counter specified by the request, wherein data for the first performance counter will be calculated for each subsequent instruction associated with the first performance counter.

21. The non-transitory computer-readable medium of claim 15, wherein the operation further comprises:
storing the performance counter data in association with the executed instruction; and upon subsequent executions of the instruction on the computer simulator, populating the performance counter using the stored performance counter data, rather than calculating updated performance counter data for the performance counter using the callback.

* * * * *